(12) United States Patent
Fanucchi et al.

(10) Patent No.: US 11,377,896 B2
(45) Date of Patent: Jul. 5, 2022

(54) ELECTRONIC TENSIONER FOR A SHORT DROP WINDOW REGULATOR SYSTEM IN A FRAMELESS DOOR

(71) Applicant: MAGNA CLOSURES INC., Newmarket (CA)

(72) Inventors: Jacopo Fanucchi, Collesalvetti (IT); Fabio Bernardo, Pisa (IT); Antonio Frello, Leghorn (IT)

(73) Assignee: MAGNA CLOSURES INC., Newmarket (CA)

( * ) Notice: Subject to any disclaimer, the term of this patent is extended or adjusted under 35 U.S.C. 154(b) by 813 days.

(21) Appl. No.: 16/276,016

(22) Filed: Feb. 14, 2019

(65) Prior Publication Data

US 2019/0257135 A1 Aug. 22, 2019

Related U.S. Application Data

(60) Provisional application No. 62/631,661, filed on Feb. 17, 2018.

(51) Int. Cl.
| | |
|---|---|
| *H02P 6/08* | (2016.01) |
| *H02P 6/17* | (2016.01) |
| *E05F 15/695* | (2015.01) |
| *H02K 7/14* | (2006.01) |
| *H02K 11/215* | (2016.01) |
| *H02K 29/08* | (2006.01) |

(52) U.S. Cl.
CPC .............. *E05F 15/695* (2015.01); *H02K 7/14* (2013.01); *H02K 11/215* (2016.01); *H02P 6/08* (2013.01); *H02P 6/17* (2016.02); *E05Y 2900/55* (2013.01); *H02K 29/08* (2013.01)

(58) Field of Classification Search
CPC ..... E05F 15/695; H02K 11/215; H02K 29/08; H02P 6/17; E05Y 2900/55
USPC ............................................................ 318/3
See application file for complete search history.

(56) References Cited

U.S. PATENT DOCUMENTS

| | | |
|---|---|---|
| 9,239,579 B2 | 1/2016 | Schlesiger et al. |
| 9,744,835 B2 | 8/2017 | Wuestlein et al. |
| | (Continued) | |

FOREIGN PATENT DOCUMENTS

| | | |
|---|---|---|
| CN | 103375086 A | 10/2013 |
| CN | 103375095 A | 10/2013 |
| | (Continued) | |

*Primary Examiner* — Jorge L Carrasquillo
(74) *Attorney, Agent, or Firm* — Dickinson Wright PLLC

(57) ABSTRACT

A window regulator system for a window coupled to a door and movable between fully open and closed positions and a short drop position and method of operation are disclosed. The system includes rails with window regulator lifter plate assemblies being moveable along the rails by cables. A motor winds the cables to move the window. An electronic control unit detects operation of at least one of a door handle and a latch of the door to identify a short drop request corresponding to the door shut or opened. The electronic control unit ensures that no freeplay exists in the window regulator system to provide accurate movement of the window and controls the motor to selectively raise the window to the fully closed position in response to the door being shut and temporarily lower the window to the short drop position in response to identifying the short drop request.

20 Claims, 14 Drawing Sheets

(56) References Cited

U.S. PATENT DOCUMENTS

| | | | |
|---|---|---|---|
| 9,777,527 B2 * | 10/2017 | Scholz | E05F 15/695 |
| 10,480,234 B2 * | 11/2019 | Otremba | E05D 15/18 |
| 2002/0092243 A1 * | 7/2002 | Maass | B60J 5/0416 49/501 |
| 2009/0007493 A1 * | 1/2009 | Hohn | E05F 15/695 49/506 |
| 2011/0126467 A1 * | 6/2011 | Scharf | B60J 5/0416 49/348 |
| 2015/0101249 A1 | 4/2015 | Pruessel et al. | |

FOREIGN PATENT DOCUMENTS

| | | | |
|---|---|---|---|
| CN | 204782485 U | 11/2015 | |
| WO | WO-2009106388 A1 * | 9/2009 | B60J 5/0416 |

* cited by examiner

ELECTRONIC TENSIONER FOR A SHORT DROP WINDOW REGULATOR SYSTEM IN A FRAMELESS DOOR

CROSS-REFERENCE TO RELATED APPLICATIONS

This utility application claims the benefit of U.S. Provisional Application No. 62/631,661 filed Feb. 17, 2018. The entire disclosure of the above application is incorporated herein by reference.

FIELD

The present disclosure relates generally to window regulator systems and more particularly to a window regulator system implementing an electronic tensioner and methods of operating the window regulator system including the electronic tensioner.

BACKGROUND

This section provides background information related to the present disclosure which is not necessarily prior art.

Vehicle doors typically have windows that can be opened and closed. Within the door, there is typically a window regulator assembly including a carrier, a motor, first and second rails and two window regulator lifter plate assemblies which are driven along the rails by cables movable by the motor to move the window of the door.

The windows used in the vehicle doors may be frameless windows in which there is no frame member engaging along a top edge of these windows when the associated door is open. With frameless windows, a seal for the window is commonly located in the roof of the vehicle as opposed to the frame (e.g., convertible vehicle). When the door is open, the window can be raised to a position which is slightly below the fully closed position. Then, when the door is shut, the window is raised to a fully closed position in which it seals into the seal extending along the bodywork of the vehicle above the window. Later, when the door handle is operated to open the door, the window is lowered out of the seal to enable the door to be opened without interference between the seal and window during this process. This lowering of the window while opening the door is commonly referred to as "Short-Drop".

A sensor can be used to sense rotations of the motor in order to determine the position of the window during such a "Short-Drop". However, the window may not start moving as soon as the motor moves because of slack in the cables and the other mechanical linkages or gear trains, so sensing the rotations of the motor does not accurately represent the window position. Because the window is typically lowered or raised for a small distance during the "Short-Drop" process, accurate movement of the window is advantageous.

Thus, there is an increasing need for improved tensioners and window regulator systems. Furthermore, other desirable features and characteristics of the present invention will become apparent from the subsequent detailed description and the appended claims, taken in conjunction with the accompanying drawings and the foregoing technical field and background.

SUMMARY

This section provides a general summary of the present disclosure and is not intended to be interpreted as a comprehensive disclosure of its full scope or all of its features, aspects and objectives.

Accordingly, it is an aspect of the present disclosure to provide a window regulator system including an electronic tensioner for a window coupled to a door of a vehicle and movable between at least a fully open position and a fully closed position and a short drop position in which the window moves a predetermined distance below the fully closed position. The system includes a motor for winding at least one cable coupled to the window to move the window. The system additionally includes a position sensor coupled to the motor for sensing a rotational position of the motor and outputting a motor position signal including a plurality of freeplay pulses corresponding with the rotational position of the motor. The system also includes an electronic control unit electrically coupled to the motor and configured to detect operation of at least one of a door handle and a latch of the door used to selectively secure and release the door for movement relative to a body portion of the vehicle to identify a short drop request corresponding to the door being one of shut and opened. The electronic control system is configured to numerically differentiate the motor position signal to obtain a motor velocity signal and to numerically differentiate the motor velocity signal to obtain a motor deceleration signal including a plurality of deceleration readings. The electronic control unit ensures that no freeplay associated with one of slack in the at least one cable and backlash of at least one window regulator lifter plate assembly and at least one rail exists in the window regulator system based on the motor deceleration signal to provide accurate movement of the window. The electronic control unit is additionally configured to control the motor based on detecting operation of at least one of the door handle and the latch of the door to selectively raise the window to the fully closed position in response to the door being shut and temporarily lower the window to the short drop position in response to identifying the short drop request.

According to another aspect of the disclosure, another window regulator system including an electronic tensioner for a window coupled to a door of a vehicle and movable between at least a fully open position and a fully closed position and a short drop position in which the window moves a predetermined distance below the fully closed position is provided. The system includes a motor for winding at least one cable coupled to the window to move the window and an electronic control unit electrically coupled to the motor. The electronic control unit is configured to detect operation of at least one of a door handle and a latch of the door used to selectively secure and release the door for movement relative to a body portion of the vehicle to identify a short drop request corresponding to the door being one of shut and opened. The electronic control unit is also configured to ensure that no freeplay associated with one of slack in the at least one cable and backlash of at least one window regulator lifter plate assembly and at least one rail exists in the window regulator system to provide accurate movement of the window. The electronic control unit controls the motor at one of a first power level to remove the slack without moving the window and at a second power level greater than the first power level to move the window based on detecting operation of at least one of the door handle and the latch of the door to selectively raise the window to the fully closed position in response to the door being shut and temporarily lower the window to the short drop position in response to identifying the short drop request.

According to yet another aspect of the disclosure, a method of operating a window regulator system including an electronic tensioner for a window coupled to a door of a vehicle and movable between at least a fully open position and a fully closed position and a short drop position in which the window moves a predetermined distance below the fully closed position is also provided. The method includes the step of detecting operation of at least one of a door handle and a latch of the door used to selectively secure and release the door for movement relative to a body portion of the vehicle to identify a short drop request corresponding to the door being one of shut and opened. The method also includes the step of sensing a rotational position of a motor coupled to the window and outputting a motor position signal including a plurality of freeplay pulses using a position sensor coupled to the motor and to the electronic control unit. Next, the method includes the steps of numerically differentiating the motor position signal to obtain a motor velocity signal using the electronic control unit and numerically differentiating the motor velocity signal to obtain a motor deceleration signal including a plurality of deceleration readings using the electronic control unit. The method continues with the step of ensuring that no freeplay associated with one of slack in the at least one cable and backlash of the at least one window regulator lifter plate assembly and the at least one rail exists in the window regulator system based on the motor deceleration signal to provide accurate movement of the window. The method proceeds by controlling the motor based on detecting operation of at least one of the door handle and the latch of the door to selectively raise the window to the fully closed position in response to the door being shut and temporarily lower the window to the short drop position in response to identifying the short drop request.

According to yet another aspect, there is provided a drive system including an electronic tensioner for moving a closure panel of a vehicle between at least one of a fully open position a fully closed position and a partially opened position, the drive system including a motor for moving at least one drive train component, for example a cable, coupled to the closure panel to move the closure panel, a position sensor coupled to the motor for sensing a rotational position of the motor and outputting a motor position signal including a plurality of freeplay pulses corresponding with the rotational position of the motor, an electronic control unit electrically coupled to the motor and the position sensor and configured to identify a position request to move the closure panel, to ensure that no freeplay associated with at least one of slack and backlash of the at least one drive train component exists in the closure panel drive system based on the plurality of freeplay pulses to provide accurate movement of the closure panel, and to control the motor based on detecting the position request to selectively move the closure panel to one of the fully closed position, the fully open position, and the partially open position.

According to yet another aspect, there is provided a method of operating a drive system including an electronic tensioner for moving a closure panel of a vehicle between at least one of a fully open position a fully closed position and a partially opened position, the method including the steps of identifying a request to move the closure panel to a predetermined position, sensing a rotational position of a motor coupled to the closure panel and outputting a motor position signal including a plurality of freeplay pulses using a position sensor coupled to the motor and to the electronic control unit, ensuring that no freeplay associated with one of slack and backlash exists in a drive assembly coupling the motor and the closure panel based on the plurality of freeplay pulses to provide accurate movement of the closure panel, and controlling the motor based to move the closure panel to the requested predetermined position in response to identifying the request.

These and other aspects and areas of applicability will become apparent from the description provided herein. The description and specific examples in this summary are intended for purpose of illustration only and are not intended to limit the scope of the present disclosure.

DRAWINGS

The drawings described herein are for illustrative purposes only of selected embodiments and not all implementations, and are not intended to limit the present disclosure to only that actually shown. With this in mind, various features and advantages of example embodiments of the present disclosure will become apparent from the following written description when considered in combination with the appended drawings, in which.

Figure 13:
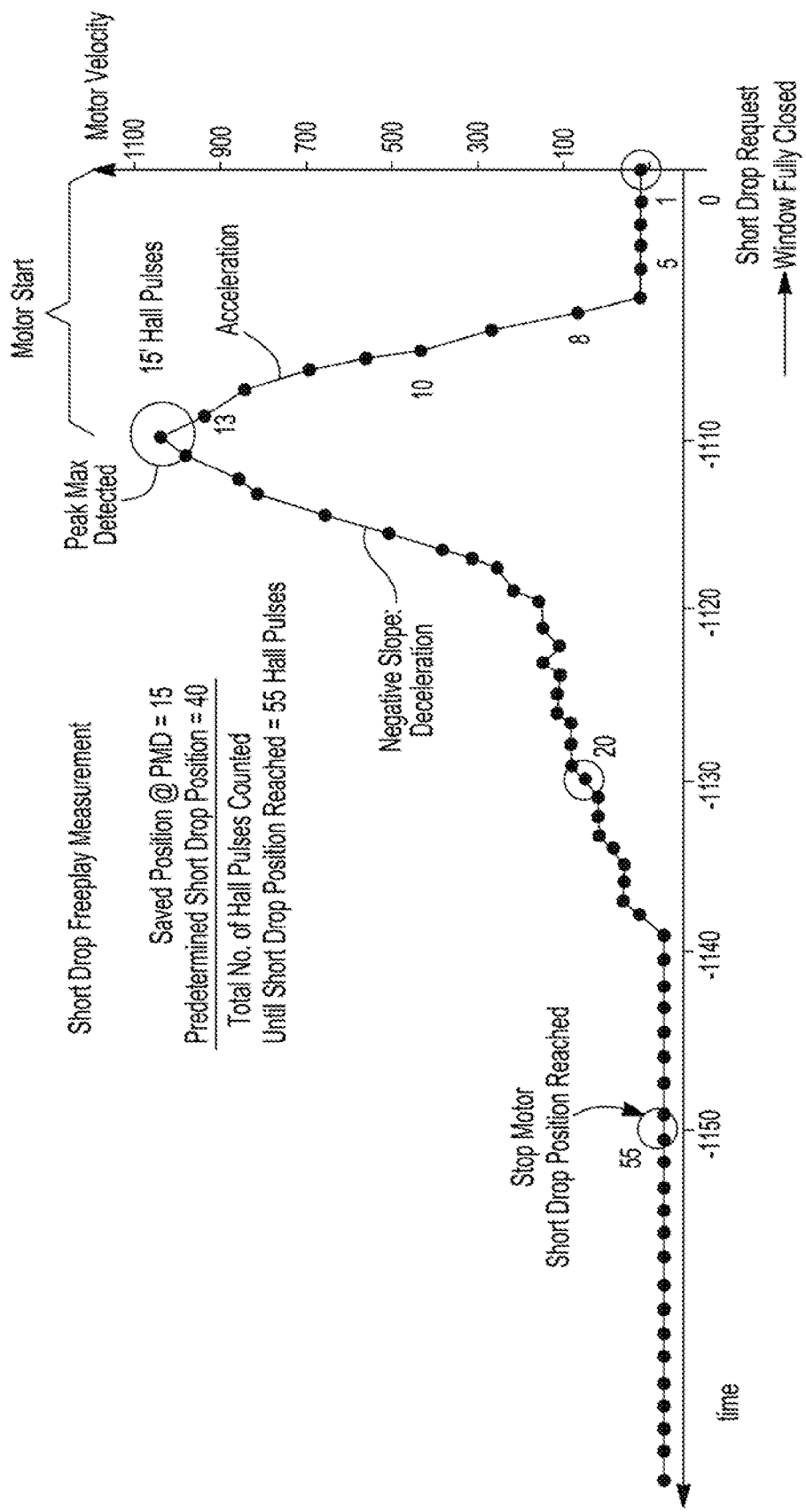
Figure 14:
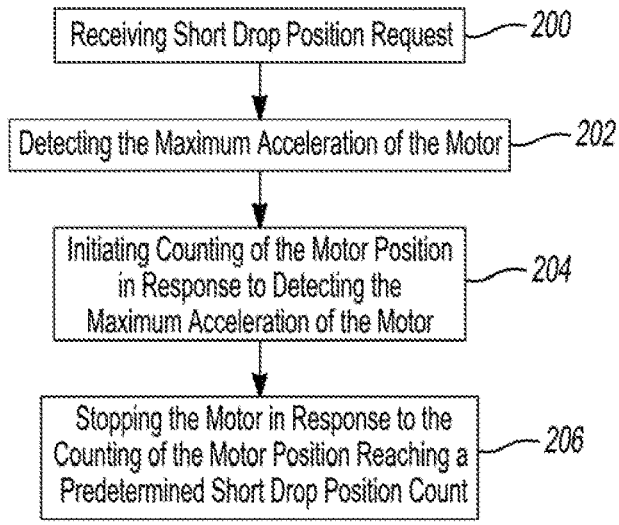
Figure 15:
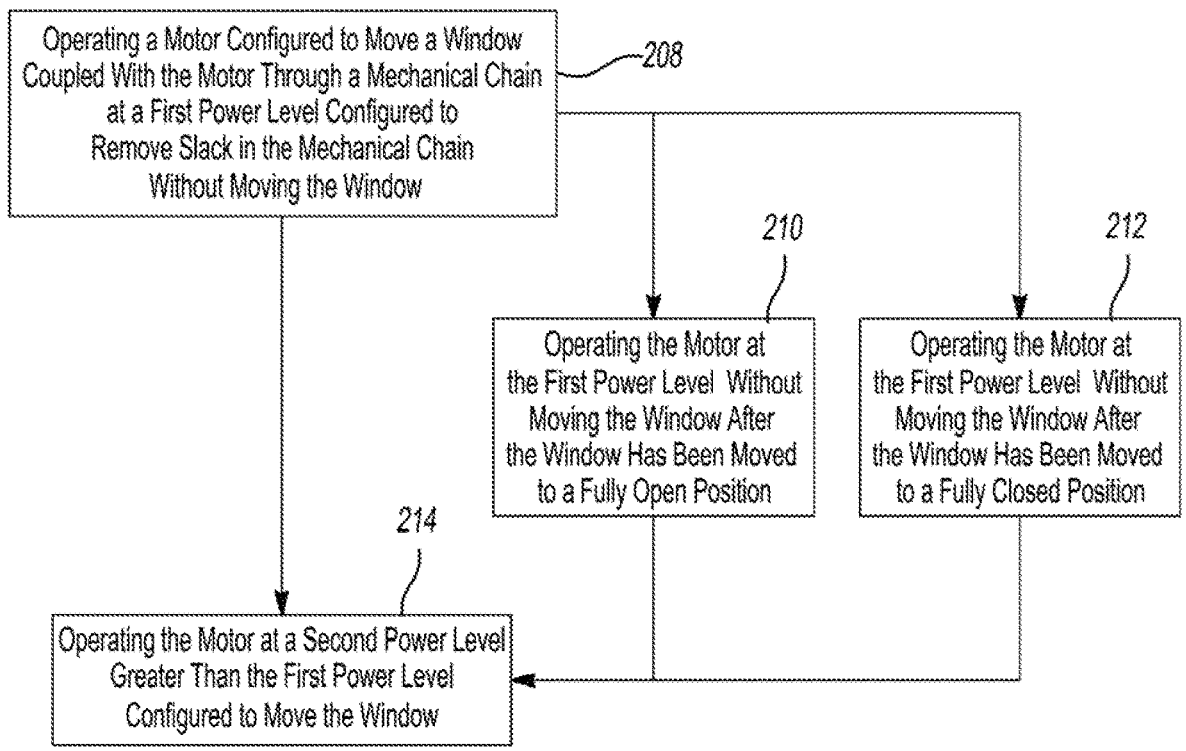

FIGS. 10, 11, and 12A-12B illustrate steps of a method of operating the window regulator system for a window coupled to a door of a vehicle and movable between at least a fully open position and a fully closed position and a short drop position in which the window moves a predetermined distance below the fully closed position according to aspects of the disclosure;

FIG. 13 illustrates another example deceleration signal of a motor of the second embodiment of the window regulator system including an indication of a peak and relative motor positions according to aspects of the disclosure; and FIGS. 14 and 15 illustrate steps of another method of operating the window regulator system for the window coupled to the door of the vehicle and movable between at least the fully open position and the fully closed position and the short drop position in which the window moves the predetermined distance below the fully closed position according to aspects of the disclosure.

DETAILED DESCRIPTION

In the following description, details are set forth to provide an understanding of the present disclosure. In some instances, certain circuits, structures and techniques have not been described or shown in detail in order not to obscure the disclosure.

In general, the present disclosure relates to a window regulator system of the type well-suited for use in many applications. More specifically, window regulator systems implementing an electronic tensioner and methods of operating the window regulator systems implementing the electronic tensioner are disclosed herein. The window regulator system of this disclosure will be described in conjunction with one or more example embodiments. However, the specific example embodiments disclosed are merely provided to describe the inventive concepts, features, advantages and objectives will sufficient clarity to permit those skilled in this art to understand and practice the disclosure.

Figure 1:
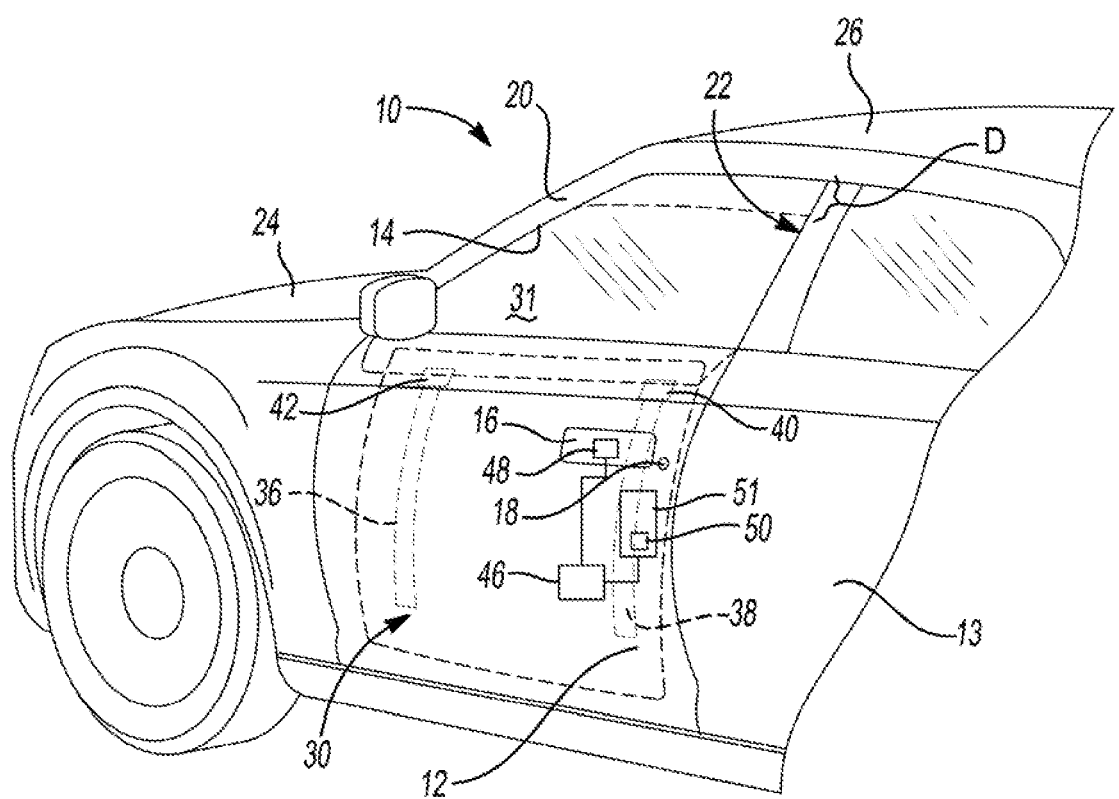
FIG. 1 is a partial perspective side view of a motor vehicle equipped with a window regulator system according to aspects of the disclosure.

Referring to the Figures, wherein like numerals indicate corresponding parts throughout the several views, a side view of a motor vehicle 10 is shown partially cut away in FIG. 1 to include a driver-side front door 12 and a driver-side rear door 13 which both provide access to a passenger compartment 14. Front door 12 is shown to include a door handle 16 and a key hole 18 is provided for otherwise conventional locking and unlocking of a mechanically-activated latch mechanism (not shown) mounted within front door 12. Movement of the door handle 16 functions to release front door 12 for movement relative to body portion 24 when the latch mechanism is unlocked. A similar door handle (not shown) could be provided on rear door 13 and interconnected to another latch mechanism (not shown) provided for locking and unlocking rear door 13. Each of the latch mechanisms may also include a power-operated actuator for controlling the locking and unlocking functions in association with a keyless or entry verification entry system. Motor vehicle 10 is shown to also include an A-pillar 20, a B-pillar 22, and a roof portion 26.

Figure 2:
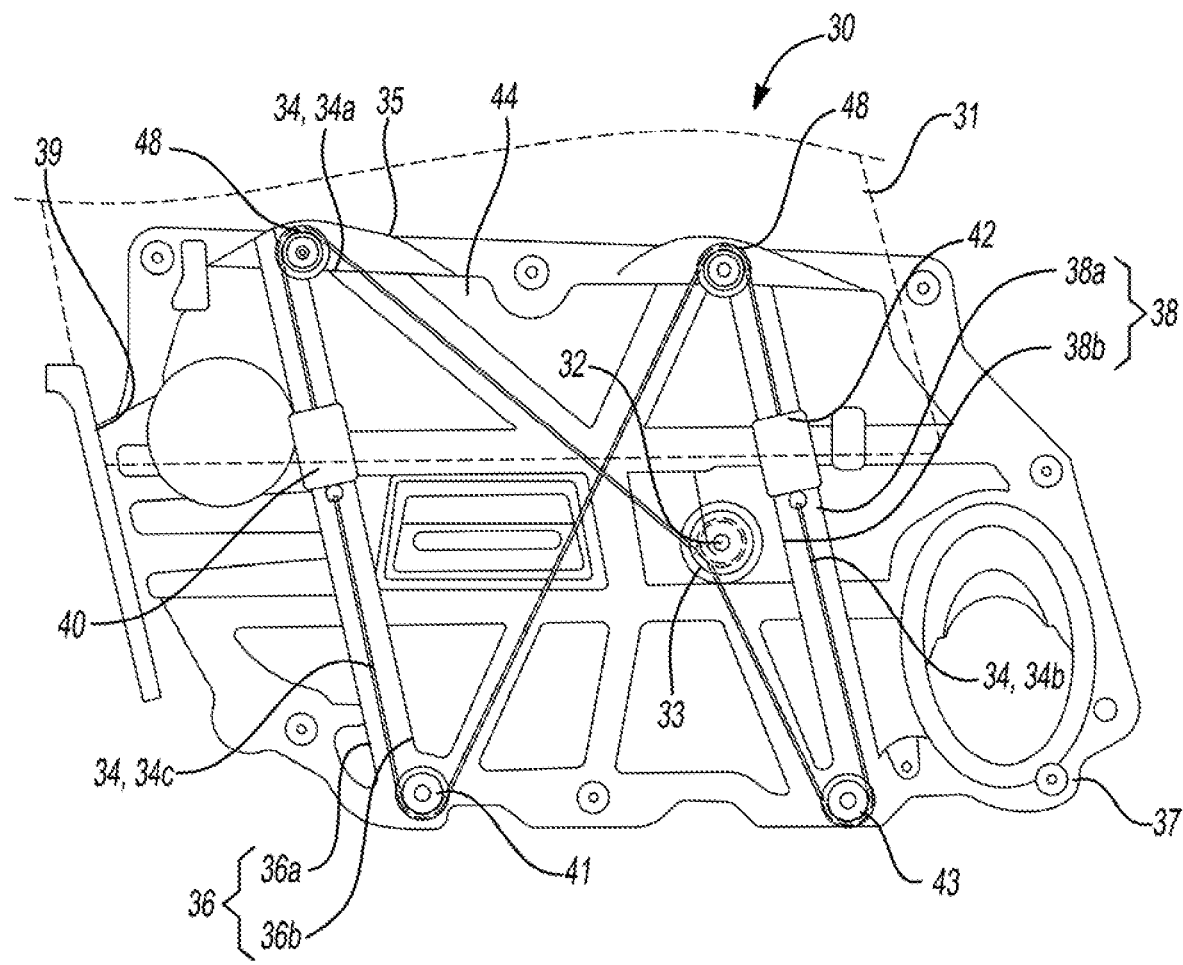
FIG. 2 is a perspective view of a window regulator assembly operated by the window regulator system according to aspects of the disclosure.

Reference is made to FIG. 2, which shows a window regulator assembly 30 for moving a vehicle window 31 up and down in a window-movement-plane in accordance with an embodiment of the present invention. The window regulator assembly 30 includes a drive motor 32 having a cable drum 33, a set of drive cables 34, including a first drive cable 34a, a second drive cable 34b and a third drive cable 34c, a carrier 35, which includes a first set of rails 36 and second set of rails 38, a first lifter plate assembly 40 and a second lifter plate assembly 42. The cable drum 33 rotates in a direction which moves, for example winds up the first drive cable 34a and lets out cable 34b therefrom. Thus, the drive motor 32 drives vertical movement of the first and second lifter plate assemblies 40 and 42 on the set of rails 36 and 38 respectively by means of the drive cables 34. The vehicle window 31 is prevented from movement relative to the window-movement-plane by at least one glass run channel, one of which is shown at 39. It is recognized that while the electronic tensioner methods and systems are described herein with reference to a window regulator system for providing accurate short drop movement and positioning of a window in accordance with one illustrative embodiment, the teachings herein may be applied to any type of vehicle closure panel drive system, such as a powered sliding door system, powered roof tops, powered liftgates, powered hoods, powered trunks, powered tailgates, and the like, having drive train components, such as cables, which may generate or introduce slack and/or backlash in the drive system provided between a motor and the closure panel for moving the closure panel.

The carrier 35 is itself mountable to the interior of a door assembly (e.g., a driver-side front door 12 or a driver-side rear door 13) that forms part of the vehicle 10. The carrier 35 is a structural element, and is configured to withstand loads incurred during operation of window regulator assembly 30. The carrier 35 includes a carrier body 44 and the aforementioned first and second set of rails 36 and 38. The first set of rails 36 may include a first rail 36a and a second rail 36b. The first rail 36a is integrally mounted to the carrier body 44. The first rail 36a is an elongate rectangular structure. The second rail 36b may be similar to the first rail 36a, and may be an elongate rectangular structure that is integral with the carrier body 44. The first and second rails 36a and 36b may be parallel to each other. The first and second rails 36a and 36b may each generally extend in a plane that is generally perpendicular to the surface of the carrier body 44. The carrier 35 includes a co-molded carrier seal, shown at 37, which is used to seal the carrier 35 with other elements of the door assembly. The carrier 35 also includes first and second integral down stops 41 and 43, which provide lower travel limits for the lifter plates 40 and 42 respectively.

While the first set of rails 36 can include two rails (i.e., rails 36a and 36b), it is alternatively possible for the first set of rails to include as little as a single rail (e.g., rail 36a), or a greater number of rails, such as three rails. The second set of rails 38 may be similar in quantity and in structure to the first set of rails 36. By configuring the first and second sets of rails 36 and 38 to extend generally perpendicularly to the surface of the carrier body 44, the carrier 35 may be more easily manufactured by a molding process, such as an injection molding process.

So, the window 31 is coupled to the door 12, 13 of the vehicle 10 and is movable between at least a fully open position and a fully closed position and a short drop position D in which the window 31 moves a predetermined distance below the fully closed position. The system includes the carrier 35 attached to the door 12, 13 and at least one rail 36, 38 is attached to the carrier 35. The at least one window regulator lifter plate assembly 40, 42 is moveable along the at least one rail 36, 38 by at least one cable 34. The motor 32 is coupled to the carrier 35 and includes a cable drum 33 rotated by the motor 32 for winding the at least one cable 34 to move the window 31.

Figure 3:
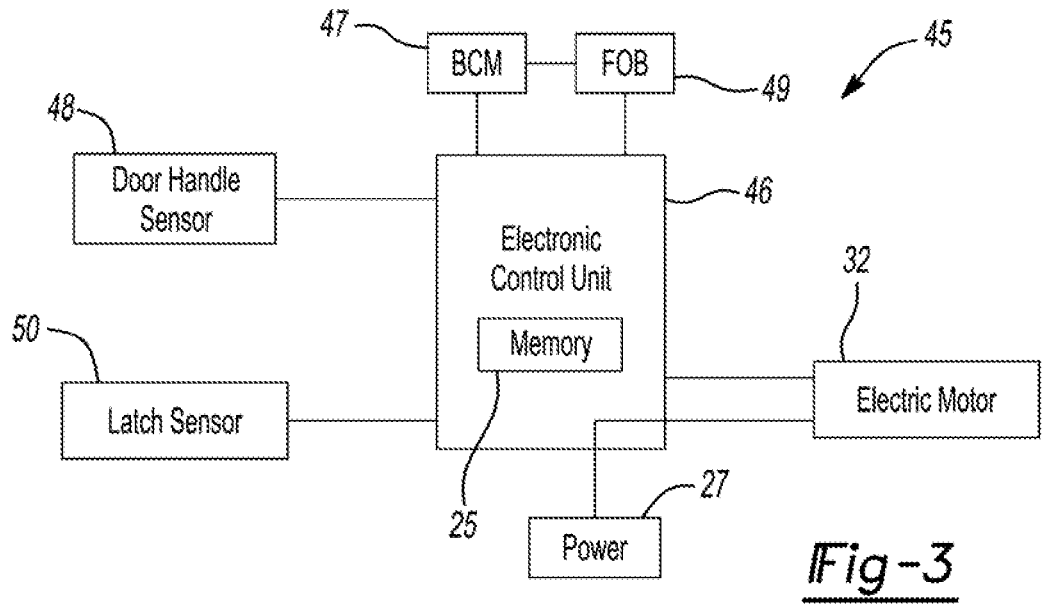
FIG. 3 is a first embodiment of the window regulator system according to aspects of the disclosure.

As best shown in FIG. 3, a first embodiment of the window regulator system 45 implementing an electronic tensioner includes an electronic control unit 46 electrically coupled to the motor 32 and configured to detect operation of at least one of a door handle 16 (e.g., using a door handle sensor 48) and a latch 51 of the door 12, 13 (e.g., using a latch sensor 50) used to selectively secure and release the door 12, 13 for movement relative to a body portion 24 of the vehicle 10 to identify a short drop request corresponding to the door 12, 13 being one of shut and opened. The electronic control unit 46, which may include a microprocessor 57 for example configured to execute software code and/or instructions stored on a memory unit 25, such as an EEPROM or other type or memory device such as a solid state disk, RAM, hard disk or the like, of the calculations and algorithms, and methods as will be described herein below. A power source 27, such as a battery (separate or the same as the vehicle main battery), may provide power to the electronic control unit 46. The electronic control unit 46 may also be in signal communication with one or more vehicle system controllers (for example the, Body Control Module 47, or BCM 47 of the vehicle 10) for receiving door open or door close requests originating from a door handle sensor, or a key FOB 49, or a contactless proximity based activation sensor, such as radar or capacitive sensors. Known window regulators may utilize mechanical tensioners, for example, to ensure that the at least one cable 34 does not have slack or is too loose. In contrast, the electronic control unit 46 of the present invention is configured to ensure that no freeplay associated with one of slack in the at least one cable 34 and backlash of the at least one window regulator lifter plate assembly 40, 42 and the at least one rail 36, 38, 38 exists in the window 31 regulator system 45 to provide accurate movement of the window 31 without the need to employ a mechanical tensioner. The electronic control unit 46 is additionally configured to control the motor 32 based on identifying a short drop request. For example, the electronic control unit 46 may identify a short drop request by detecting an operation of at least one of the door handle 16 and the latch of the door 12, 13 to selectively raise the window 31 to the fully closed position in response to the door 12, 13 being shut and temporarily lower the window 31 to the short drop position in response to identifying the short drop request. Other manners of identifying a short drop request by the electronic control unit 46 may be provided, for example the electronic control unit 46 may receive a signal from the BCM 47 requesting the window 31 be moved to the short drop position from a fully closed position, for example after the BCM 47 has received a powered door open request from the FOB 49. As another example, the electronic control unit 46 may be configured to detect a movement of the door 12, 13 to or at a predetermined position, for example indirectly, by receiving a position signal from the latch 51 that the latch 51 has transitioned to a secondary latching state and the door 12, 13 having moved to a partially opened position, or directly, by sensing the position of the door 12, 13. The electronic control unit 46 is further configured to remove slack in the at least one cable 34 and backlash of the at least one window regulator lifter plate assembly 40, 42 and the at least one rail 36, 38 by driving the motor 32 with power sufficient to generate torque capable of moving the motor 32 when the motor 32 is free to run while not capable of moving the window 31. In more detail, this removal of slack and/or backlash can occur by operating the motor 32 in an opposite direction from that used to close the window 31. When the window 31 is in its fully closed position, the system 45 can thus prepare to move the window 31 to its short drop position.

Therefore, the electronic control unit 46 is configured to remove slack in the at least one cable 34 and backlash of the at least one window regulator lifter plate assembly 40, 42 and the at least one rail 36, 38 by driving the motor 32 with power sufficient to generate torque capable of moving the motor 32 to move the window 31 in a direction toward the fully open position when the motor 32 is free to run while not capable of moving the window 31 in response to the window 31 being in the fully closed position. So, the electronic control unit 46 is configured to pulse width modulate a voltage supplied to the motor 32 with a first duty cycle enabling the motor 32 to move the window 31 (e.g., when moving the window 31 from its fully closed position to the short drop position or during operation to move the window 31 after being commanded to by a power window switch). The electronic control unit 46 is also configured to pulse width modulate the voltage supplied to the motor 32 (e.g., using a motor bridge) with a second duty cycle being less than the first duty cycle and not enabling the motor 32 to move the window 31 (i.e., to take up remove the slack and/or backlash). In other words, the second duty cycle is only enough to move the motor 32 when the motor 32 is taking up slack in the at least one cable 34, for example. Then, the electronic control unit 46 is configured to stop pulse width modulating the voltage supplied to the motor 32 with the second duty cycle being less than the first duty cycle after the predetermined timeout has elapsed. In another example, the electronic control unit 46 is configured to stop pulse width modulating the voltage supplied to the motor 32 in response to a stall state of the motor 32 having been detected by the electronic control unit 46 where electronic control unit 46 is configured to receive and analyze back EMF signals sensed on motor power supply lines 133, for example by detecting current spikes. As another operational example, the electronic control unit 46 is configured to pulse width modulate a voltage supplied to the motor 32 with a first duty cycle enabling the motor 32 to move the window 31, for example, when moving the window 31 from its fully opened or partially opened position to its fully closed position after being commanded to by a power window switch, as an example). After the window 31 has been moved to the fully closed position, the electronic control unit 46 is also configured to pulse width modulate the voltage supplied to the motor 32 (e.g., using a motor bridge) with a second duty cycle being less than the first duty cycle to move the motor 32 in an opposite direction than the direction the motor 32 is driven resulting from the supplied first duty cycle and not enabling the motor 32 to move the window 31 (i.e., to take up remove the slack and/or backlash). As another example, the electronic control unit 46 is configured to pulse width modulate a voltage supplied to the motor 32 with a first duty cycle enabling the motor 32 to move the window 31 (e.g., when moving the window 31 from its fully opened to the short drop position or during operation to move the window 31) and after the window 31 reaching the short drop position the electronic control unit 46 is also configured to pulse width modulate the voltage supplied to the motor 32 (e.g., using a motor bridge) with a second duty cycle being less than the first duty cycle and for driving the motor 32 in an opposite direction and not enabling the motor 32 to move the window 31 (i.e., to take up remove the slack and/or backlash). Thus, the system 45 is ready for the next actuation of the window 31 and any noise is covered by the actuation to move the window 31 closed.

In addition, the electronic control unit 46 is further configured to update a zero position of the motor 32 using the electronic control unit 46 in response to stopping the pulse width modulating the voltage supplied to the motor 32 with the second duty cycle being less than the first duty cycle after the predetermined timeout has elapsed. Advantageously, the system 45 is able to correct the lag or slack without requiring the use of sensors and no special hardware is required (i.e., low processor capabilities utilized, no dedicated hardware peripherals are necessary), and provide a quick movement response time of the window 31 when the motor 32 is next powered to move the window 31. Additionally, algorithms utilized by the electronic control unit 46 (for example algorithms stored in memory 25 as instructions and executed by the microprocessor 57 of electronic control unit 46) are not dependent on the cause of the position lag or slack.

Figure 4:
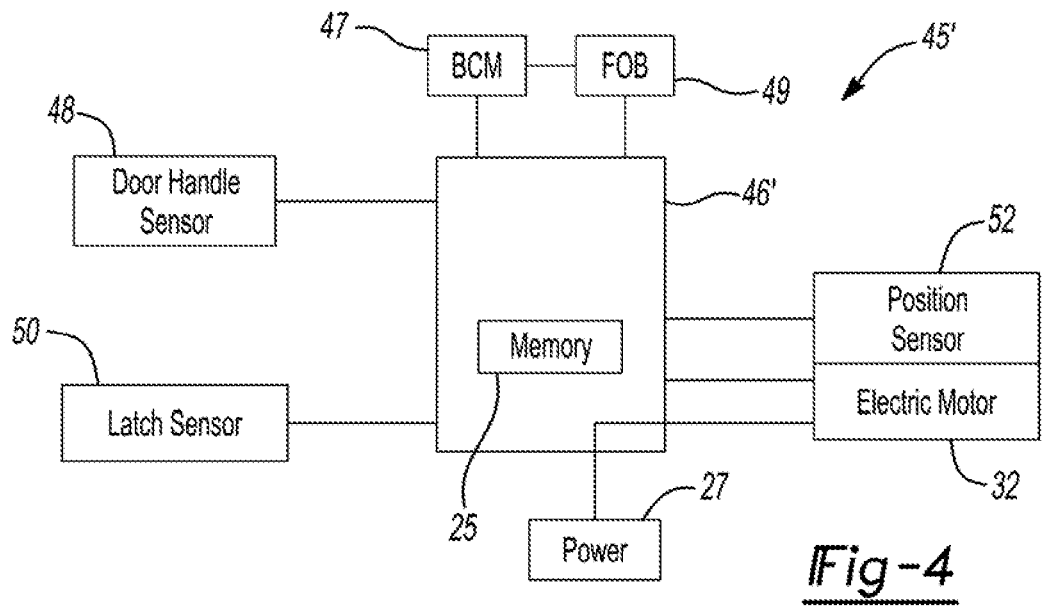
FIG. 4 is a second embodiment of the window regulator system according to aspects of the disclosure.
Figure 5:
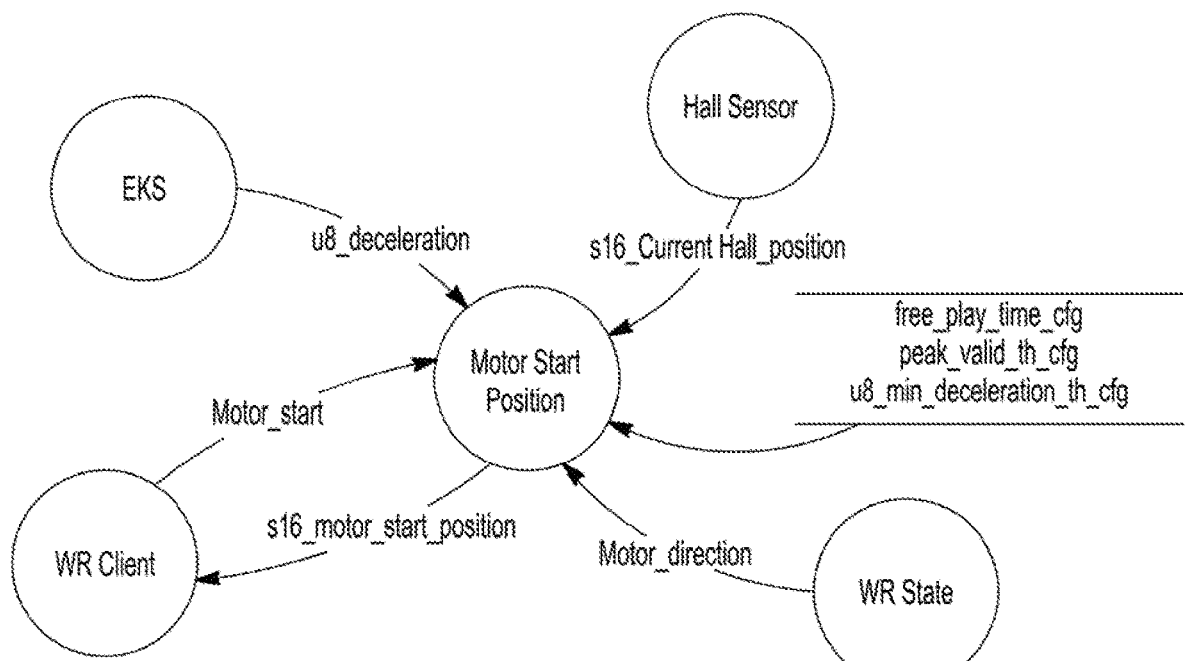
FIG. 5 is a process context diagram for the motor start position of the second embodiment of the window regulator system according to aspects of the disclosure.

As best shown in FIG. 4, a second embodiment of the system 45' implementing an electronic tensioner includes the electronic control unit 46'. The electronic control unit 46' operates in various states. Specifically, a process context diagram for the motor 32 start position is shown in FIG. 5. The second embodiment of the system 45' also includes a position sensor 52 coupled to the motor 32 and to the electronic control unit 46' for sensing a rotational position of the motor 32 and outputting a motor position signal including a plurality of freeplay pulses corresponding with the rotational position of the motor 32. Thus, the electronic control unit 46' is configured to detect the rotational position of the motor 32 using the position sensor 52 and control the motor 32 using the motor position signal. According to an aspect, the position sensor 52 is a Hall effect sensor. It is recognized that other manners of sensing a rotational position of the motor 32 may be provided, for example electronic control unit 46 may be configured to implement ripple counting calculations, stored as instructions in memory 25, to sense and analyze the ripples generated by the rotation of the motor 32 and propogating over the motor power supply lines 133. The electronic control unit 46' can further be configured to count the plurality of freeplay pulses corresponding to the rotations of the motor 32 to determine a distance from a start position of the motor 32 in response to detecting the rotational position of the motor 32.

Figure 6A:
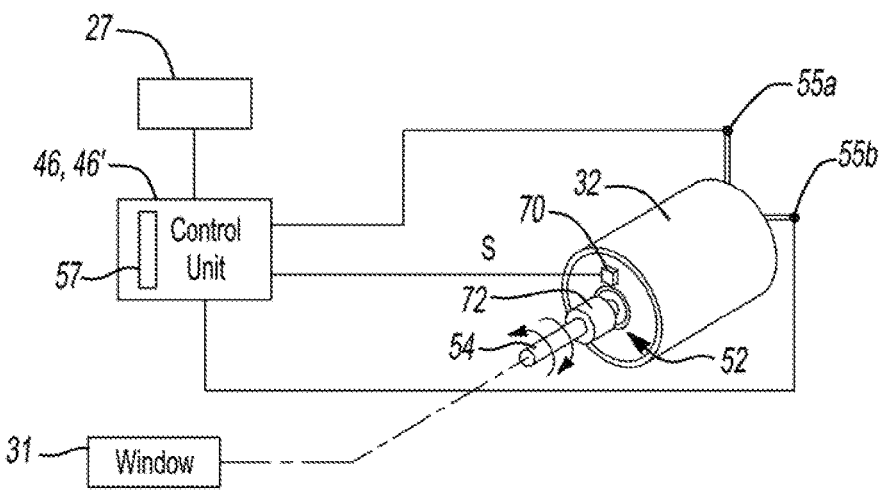
FIG. 6A is a schematic block diagram of the first and second embodiment of the window regulator system according to aspects of the disclosure.
Figure 6B:
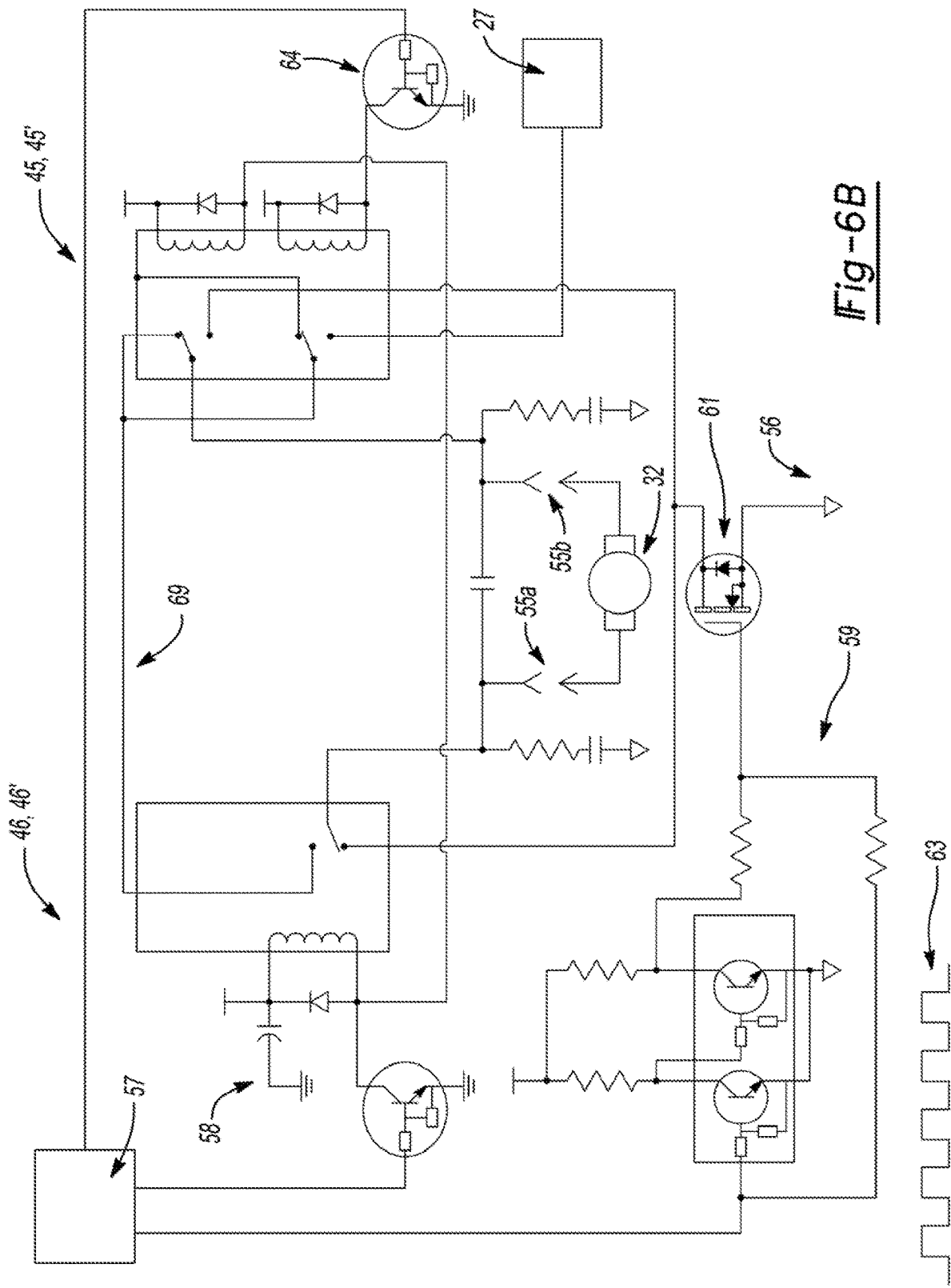
FIG. 6B is a circuit diagram of the first and second embodiment of the window regulator system according to aspects of the disclosure.

FIGS. 6A and 6B illustrate further details of one or both the first embodiment of the window regulator system 45 and the second embodiment of the window regulator system 45' according to aspects of the disclosure. In a known manner, not discussed in detail here, the motor 32 includes a rotor, operable to rotate with respect to a stator. In the example shown, the motor 32 is of the brushed rotary type and is coupled to a shaft 54, which in turn is coupled to the window 31 (e.g., via the drive cables 34 to move the window 31 along the rails 36, 38 with the lifter plate assemblies 40, 42). It is recognized that motor 32 may be a brushless motor.

The motor 32 is operable to rotate the shaft 54 in a first direction, e.g. clockwise, and in a second opposite direction, e.g. anti-clockwise, via application of power supply signals with respective, reversed, polarities. In particular, the motor 32 has a first and a second supply input terminal 55a, 55b, which are designed to be selectively coupled to the power source 27, providing a positive power supply signal $V_s$, e.g. equal to +12 V for example, and coupled to ground 56, providing a reference ground potential GND (or a negative power supply signal). A motor bridge 69 is provided between the first and a second supply input terminal 55a, 55b of the motor 32 and the power source 27 and ground 56, and is operable to control a direction of movement thereof. Specifically, a first controlled switching element 58 (e.g., a FET or field effect transistor), selectively couples the first supply input terminal 55a of motor 32 to one of the power source 27 and ground 56, while a second controlled switching element 64 couples the second supply input terminal 55b to the other one of the power source 27 and ground 56. The first controlled switching element 58 and a second controlled switching element 64 are electrically connected to electronic control unit 46, 46' and receive at their inputs control signals for controlling the switching states of the switching elements 58, 64 to control the application of the polarity of the power supply signals to control the rotational direction of the motor 32. FIG. 6B illustrates the motor bridge in an "OFF" state to stop the motor 32, and in other words by not provide power supplied from the power source 27 to the motor 32. For example activation of controlled switching elements 58, 64 may also occur in case of a window regulator implementing an anti-pinch feature, the electronic control unit 46, 46' may actively stop providing energy to the motor 32 in a requested direction, and possibly provide energy in the opposite direction, when an obstacle, or an obstruction is sensed, by an anti-pinch system in the path of the window in the given direction (in a known manner, here not discussed in detail).

When the first controlled switching element 58 is engaged, or activated (and the second controlled switching element 64 is not engaged, or deactivated), the first controlled switching element 58 connects the first supply input terminal 55a to the power supply 27, providing thereto the positive supply signal $V_s$; and the second controlled switching element 64 connects the second supply input terminal 55b to the reference ground potential GND.

Likewise, when the first controlled switching element 58 is not engaged (and the second controlled switching element 64 is engaged), the first controlled switching element 58 connects the first power supply terminal 55a to the reference ground potential GND; and the second controlled switching element 64 connects the second power supply terminal 55b to the power supply 27, providing thereto the positive supply signal $V_s$.

When a motor stop command is issued by the electronic control unit 46, 46', the supply input terminals 55a, 55b of the motor 32 are electrically shorted by deactivation of both controlled switching elements 58, 64, thereby braking the motor 32. The switching arrangement including the first and second controlled switching elements 58, 64 therefore allows for inversion of the polarity of power supply signals provided to the motor 32, and stopping of the motor 32; moreover, operation of the same switching arrangement is indicative of the direction of movement of the motor 32.

A pulse width modulating generating switching arrangement 59 circuit is controlled by the electronic controller 46, 46' to control a low side FET 61 for shorting one of the supply input terminals 55a, 55b to ground 56 in accordance to a modulation signal 63 supplied from the controller 46, 46'. Modulation signal 63 can be generated to have a variable duty cycle for switching one of the supply input terminals 55a, 55b to ground 56 to control the power supplied to the motor 32 by regulating the time the amount of voltage is applied across the supply input terminals 55a, 55b to thereby drive the motor 32 with a sequence of "ON-OFF" pulses and varying the duty cycle, or the time period that the applied voltage is "ON" relative to when it is "OFF", of the pulses while maintaining the frequency constant.

As discussed above, the system 45, 45' includes the position sensor 52, coupled to the motor 32, in order to incrementally detect the amount of rotation thereof. Particularly, position sensor 52 may comprise an incremental position sensor 70; in a possible embodiment, position sensor 52 includes a magnetic Hall sensor coupled to a fixed, stator body of the motor 32, and cooperating with a magnet ring 72 mounted about the shaft 54 of the motor 32. The position sensor 70 determines an incremental change of position of the motor 32 with respect to a previous position, this incremental change being positive, or negative, depending on the direction of movement of the motor 32.

Figure 7:
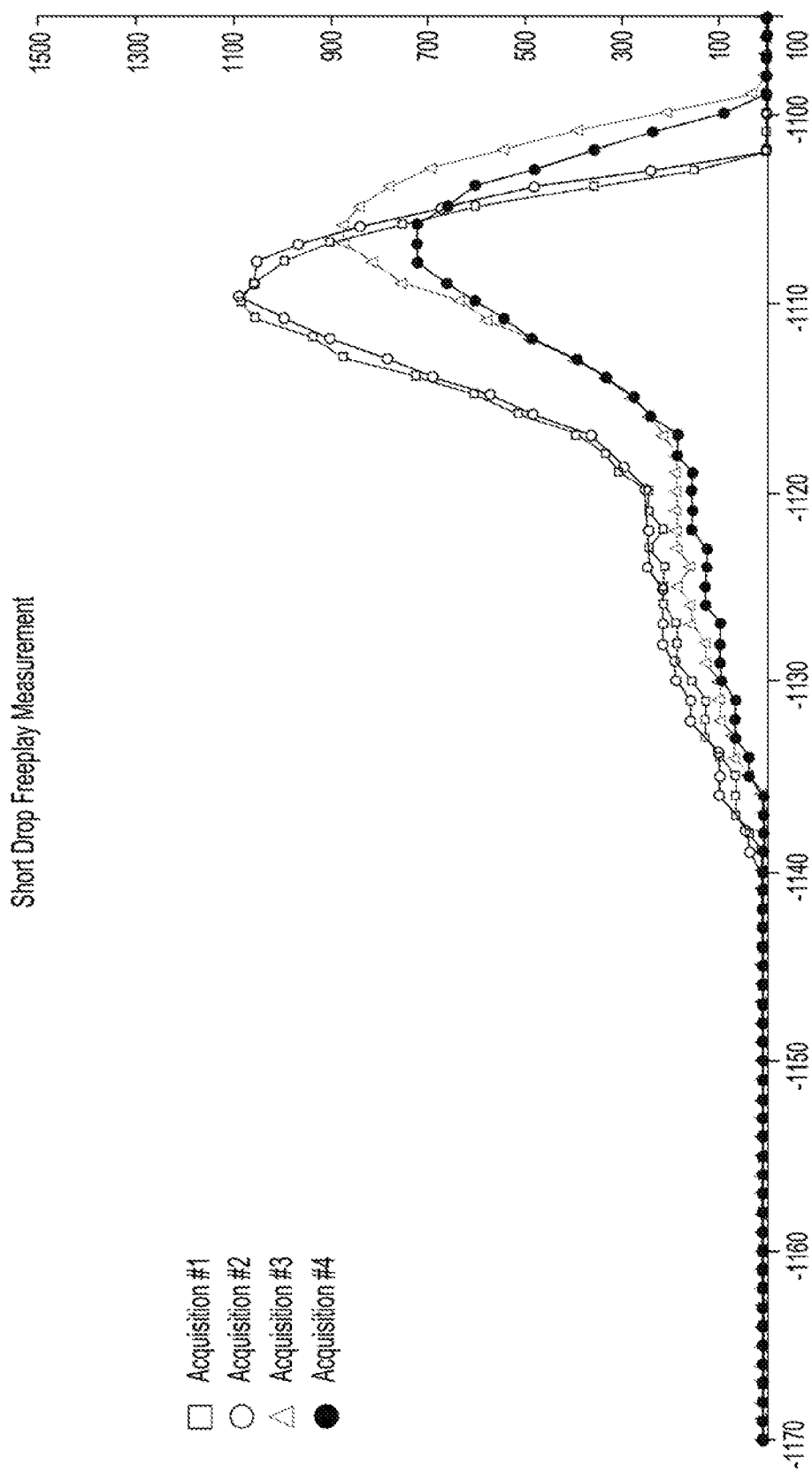
FIG. 7 illustrates numerous example motor deceleration signals each including a plurality of deceleration readings utilized in the second embodiment of the window regulator system according to aspects of the disclosure.

Referring back to the second embodiment of the system 45' in FIGS. 4 and 5, the electronic control unit 46' is further configured to numerically differentiate the motor position signal to obtain a motor velocity signal and numerically differentiate the motor velocity signal to obtain a motor deceleration signal including a plurality of deceleration readings. FIG. 7 illustrates numerous motor deceleration signals each including a plurality of deceleration readings. In more detail, as shown, the electronic control unit 46' uses the 3rd point after physical peak to discern from a "false" peak. The curves shown in FIG. 7 go down at different speed and therefore the final point (the short drop position) is the same; however, due to the different speeds, the acceleration peaks of each acquisition of the motor deceleration signals are at different times.

The electronic control unit 46' is further configured to count a plurality of pulses corresponding to the rotations of the motor 32 when no freeplay exists, for example the electronic control unit 46' may be configured to count a plurality of pulses corresponding to the rotations of the motor 32 in response to the electronic control unit 46' having analyzed the plurality of free play pulse and for example identifying a peak in the motor deceleration signal determined using, or processing of, the freeplay pulses. For example, electronic control unit 46' may count a plurality of pulses or non-freeplay pulses identifying the third freeplay pulse after the physical deceleration peak to initiate the counting of the non-freeplay pulses, in order to discern from a "false" peak, for example as a result of the window regulator cable 34 being stretched after the peak is detected so as to compensate for slack introduced as a result of this initial stretching of the cable 34 when no freeplay exists, and stop the motor 32 when a plurality of pulses reaches a predetermined short drop parameter distance count to move the window 31 to the short drop position. It is recognized that the electronic control unit 46' may be configured reject false peaks in other manners, for example by counting a plurality of pulses corresponding to the rotations of the motor 32 after the electronic control unit 46' has identified a peak in the motor deceleration signal determined using the freeplay pulses, such as counting a plurality of pulses after identifying the second, or fourth, or other freeplay pulse(s) after identifying the physical deceleration peak to discern from a "false" peak. The electronic control unit 46' may be further configured in other manners to determine when no freeplay exists in the system to begin counting a plurality of pulses corresponding to the rotations of the motor 32, for example the electronic control unit 46' may identify a peak in the motor deceleration signal determined using the freeplay pulses by numerically differentiating the motor position signal to obtain a motor velocity signal, and determining if the motor velocity signal remains constant over a period of time or for a number of pulses (e.g. 3 pulses).

Figure 8:
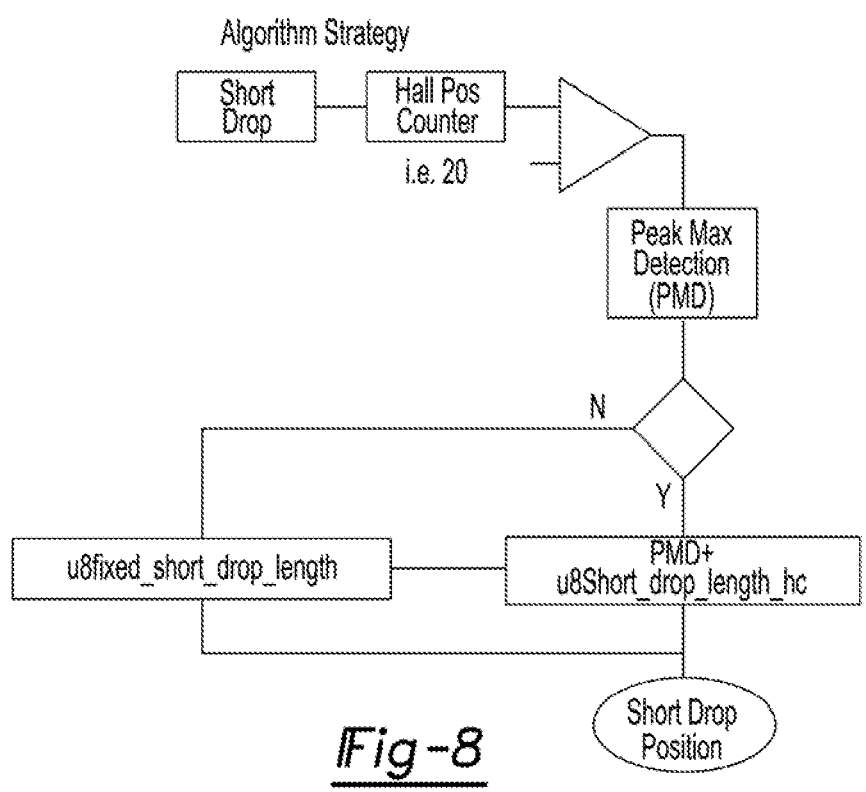
FIG. 8 illustrates an algorithm strategy employed by the electronic control unit of the second embodiment of the window regulator system according to aspects of the disclosure.

As illustrated in an algorithm strategy employed by the electronic control unit 46' shown in FIG. 8, once there is a short drop request, a counter counts the freeplay or Hall pulses from which a correction parameter (e.g., the first 20 points from beginning of movement) are discarded. This is done because the first points from the beginning of movement of the motor 32 are not reliable due to the Hall pulse calculation. If a peak is detected, a predetermined short drop position (e.g., 40) is added to the count of the Hall pulses in determining the final short drop position. If a peak is not detected, the motor 32 will move a predetermined maximum freeplay distance (e.g., 55 Hall pulses) before the motor 32 is stopped.

Figure 9:
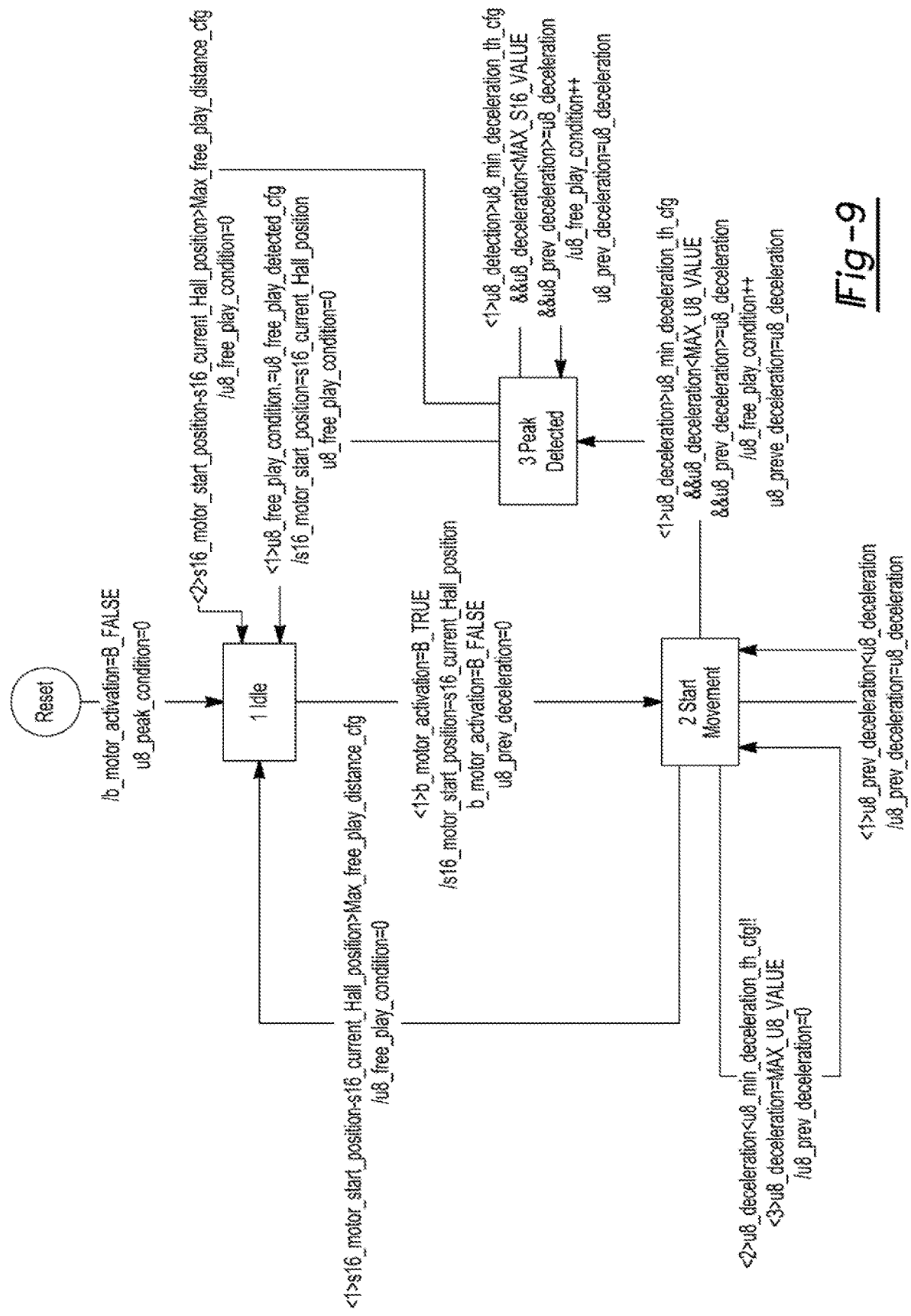
FIG. 9 is a state transition diagram utilized by the electronic control unit of the second embodiment of the window regulator system according to aspects of the disclosure.
Figure 10:
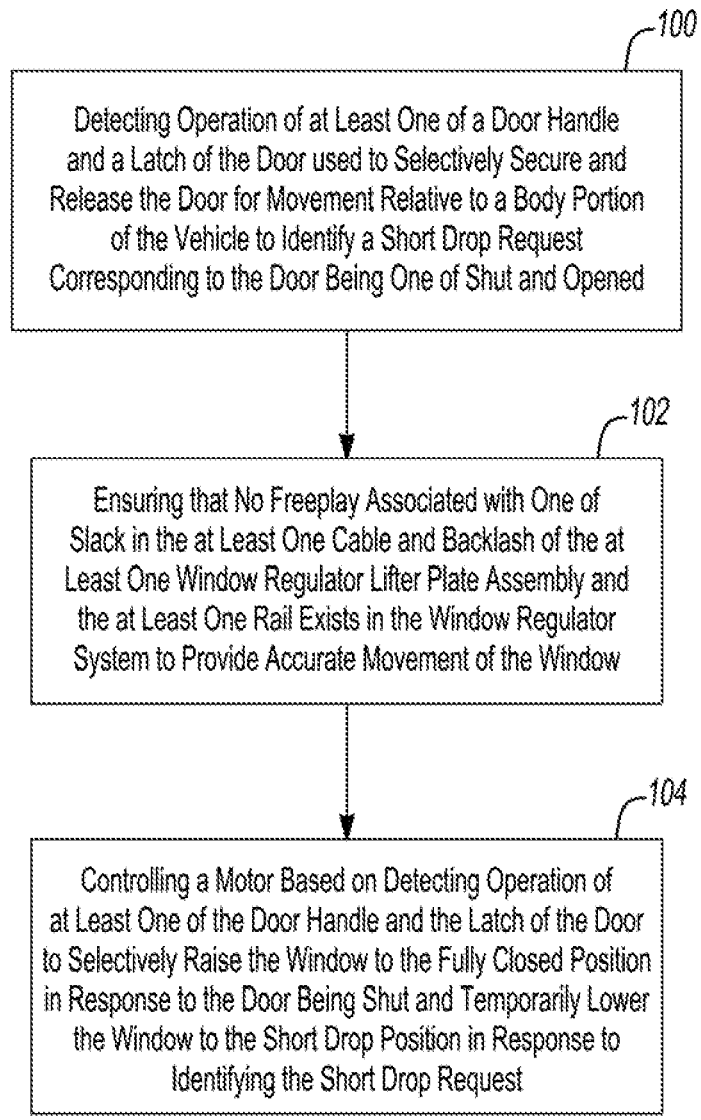

A state transition diagram is shown in FIG. 9, and illustrates that the electronic control unit 46' is configured to transition from a reset state to a start movement state in response to identifying the short drop request and receiving the motor position signal from the position sensor 52. The electronic control unit 46' can determine whether the distance from the start position of the motor 32 exceeds a predetermined maximum freeplay distance and transition to an initialization state in response to the distance from the start position of the motor 32 exceeding the predetermined maximum freeplay distance.

The electronic control unit 46' can also analyze the motor deceleration signal to determine whether one of the plurality of deceleration readings is greater than a predetermined deceleration threshold and lower than a previous one of the plurality of deceleration readings. The electronic control unit 46' can then be configured to transition to a peak detected state in response to determining the one of the plurality of deceleration readings is greater than the predetermined deceleration threshold and lower than the previous one of the plurality of deceleration readings and update values of the motor deceleration signal in response to determining the one of the plurality of deceleration readings is greater than the previous one of the plurality of deceleration readings. Such a peak is detected when the free play ends at the beginning of a short drop procedure (e.g., when the door 12, 13 is opened and the window 31 needs be moved to its short drop position). This time corresponds to when movement of the motor 32 causes the window 31 to move. So, each time a peak condition is detected a counter is increased. When the counter reach a fixed value a real peak is detected. The electronic control unit 46' can also set the previous one of the plurality of deceleration readings to zero in response to determining the one of the plurality of deceleration readings is less than the predetermined deceleration threshold.

The electronic control unit 46' additionally determines whether the one of the plurality of deceleration readings is valid and sets the previous one of the plurality of deceleration readings to zero in response to determining the one of the plurality of deceleration readings is not valid. The electronic control unit 46' can also update a peak counter in response to determining the one of the plurality of deceleration readings is greater than the predetermined deceleration threshold and one of equal to the previous one of the plurality of deceleration readings and lower than the previous one of the plurality of deceleration readings. The electronic control unit 46' can then determine whether the peak counter is greater than a counter threshold and save the plurality of freeplay pulses in response to determining the peak counter is greater than the counter threshold. Finally, the electronic control unit 46' can return to the initialization state and discard the plurality of freeplay pulses in response to the distance from the start position of the motor 32 exceeding the predetermined maximum freeplay distance. So, if the peak condition is not recognized within a maximum estimate of free play Hall pulses, the short drop procedure stops the window 31 in a position not lower than a predetermined distance (e.g., 12 millimeters) from the fully closed position of the window 31. In other words, if the peak isn't recognized, after a fixed distance (e.g., the predetermined maximum freeplay distance) the window shall be stopped.

As best shown in FIGS. 10, 11, and 12A-12B, a method of operating a window 31 regulator system 45, 45' implementing an electronic tensioner for a window 31 coupled to a door 12, 13 of a vehicle 10 and movable between at least a fully open position and a fully closed position and a short drop position in which the window 31 moves a predetermined distance below the fully closed position is also provided. The method includes the step of 100 detecting, for example, operation of at least one of a door handle 16 and a latch of the door 12, 13 used to selectively secure and release the door 12, 13 for movement relative to a body portion 24 of the vehicle 10 to identify a short drop request corresponding to the door 12, 13 being one of shut and opened. It is recognized that the methods and systems described herein may include identifying a short drop request in other manners, such as for example by detecting a signal received from the BCM 47, or based on a state of the door 12, 13, the state of the latch 51, and the like. The method continues with the step of 102 ensuring that no freeplay associated with one of slack in at least one cable 34 and backlash of at least one window regulator lifter plate assembly 40, 42 and at least one rail 36, 38 exists in the window 31 regulator system 45, 45' to provide accurate movement of the window 31. The method proceeds by 104 controlling a motor 32 based on detecting operation of at least one of the door handle 16 and the latch of the door 12, 13 to selectively raise the window 31 to the fully closed position in response to the door 12, 13 being shut and temporarily lower the window 31 to the short drop position in response to identifying the short drop request.

Figure 11:
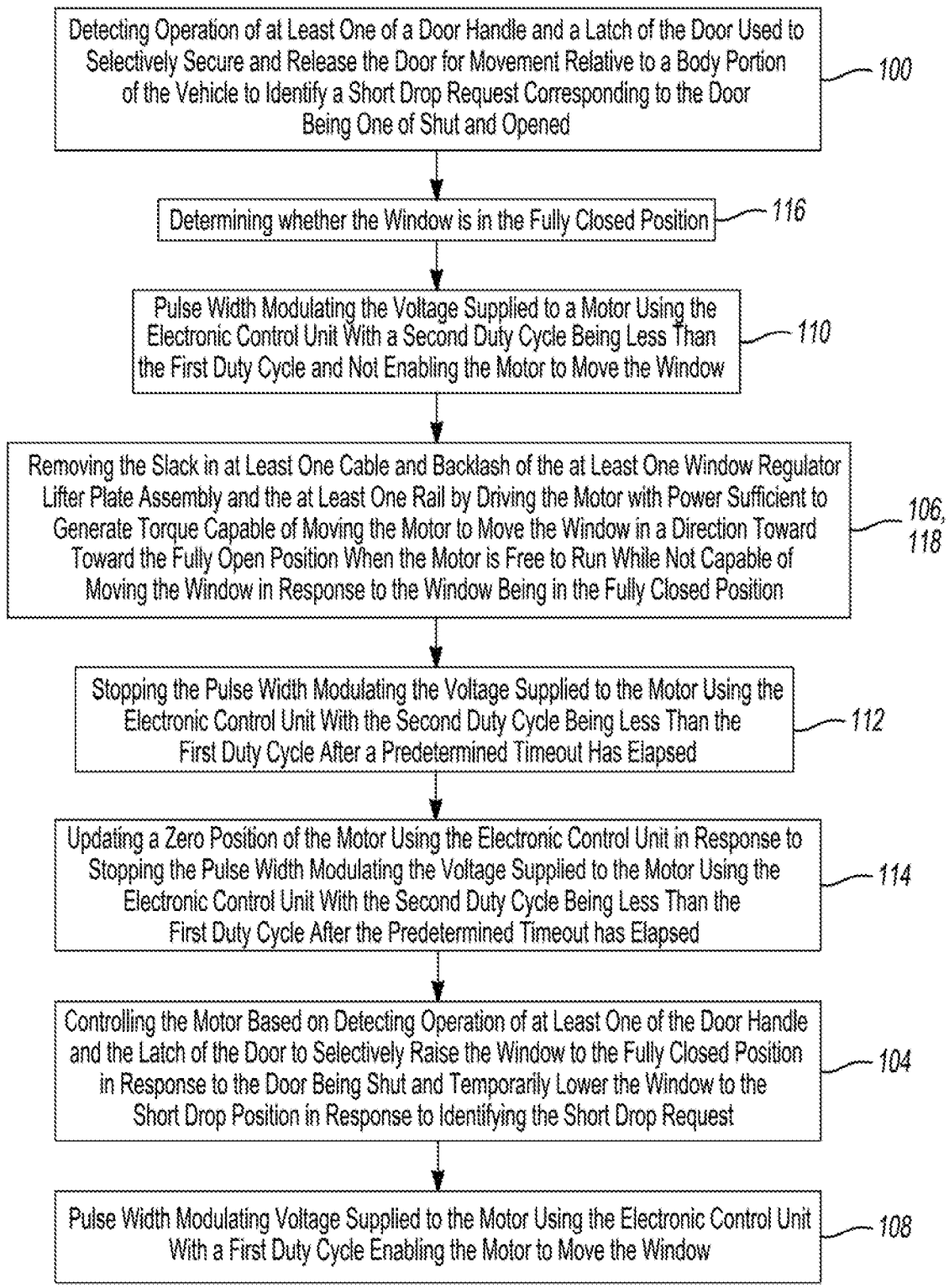

As implemented by the first embodiment of the system 45 and referring to FIG. 11, the step of 102 ensuring that no freeplay associated with one of slack in the at least one cable 34 and backlash of the at least one window regulator lifter plate assembly 40, 42 and the at least one rail 36, 38 exists in the window 31 regulator system 45, 45' to provide accurate movement of the window 31 includes the step of 106 removing slack in the at least one cable 34 and backlash of the at least one window regulator lifter plate assembly 40, 42 and the at least one rail 36, 38 by driving the motor 32 with power sufficient to generate torque capable of moving the motor 32 when the motor 32 is free to run while not capable of moving the window 31. The step of 104 controlling a motor 32 based on detecting operation of at least one of the door handle 16 and the latch of the door 12, 13 to selectively raise the window 31 to the fully closed position in response to the door 12, 13 being shut and temporarily lower the window 31 to the short drop position in response to identifying the short drop request includes the step of 108 pulse width modulating a voltage supplied to the motor 32 using the electronic control unit 46 with a first duty cycle enabling the motor 32 to move the window 31. Then, the step of 106 removing slack in the at least one cable 34 and backlash of the at least one window regulator lifter plate assembly 40, 42 and the at least one rail 36, 38 by driving the motor 32 with power sufficient to generate torque capable of moving the motor 32 when the motor 32 is free to run while not capable of moving the window 31 includes the step of 110 pulse width modulating the voltage supplied to the motor 32 using the electronic control unit 46 with a second duty cycle being less than the first duty cycle and not enabling the motor 32 to move the window 31. Next, 112 stopping the pulse width modulating the voltage supplied to the motor 32 using the electronic control unit 46 with the second duty cycle being less than the first duty cycle after a predetermined timeout has elapsed.

The method also includes the step of 114 updating a zero position of the motor 32 using the electronic control unit 46 in response to stopping the pulse width modulating the voltage supplied to the motor 32 using the electronic control unit 46 with the second duty cycle being less than the first duty cycle after the predetermined timeout has elapsed. The method further includes the step of 116 determining whether the window 31 is in the fully closed position and so the step of 106 removing slack in the at least one cable 34 and backlash of the at least one window regulator lifter plate assembly 40, 42 and the at least one rail 36, 38 by driving the motor 32 with power sufficient to generate torque capable of moving the motor 32 when the motor 32 is free to run while not capable of moving the window 31 can be further defined as 118 removing slack in the at least one cable 34 and backlash of the at least one window regulator lifter plate assembly 40, 42 and the at least one rail 36, 38 by driving the motor 32 with power sufficient to generate torque capable of moving the motor 32 to move the window 31 in a direction toward the fully open position when the motor 32 is free to run while not capable of moving the window 31 in response to the window 31 being in the fully closed position.

Figure 12A:
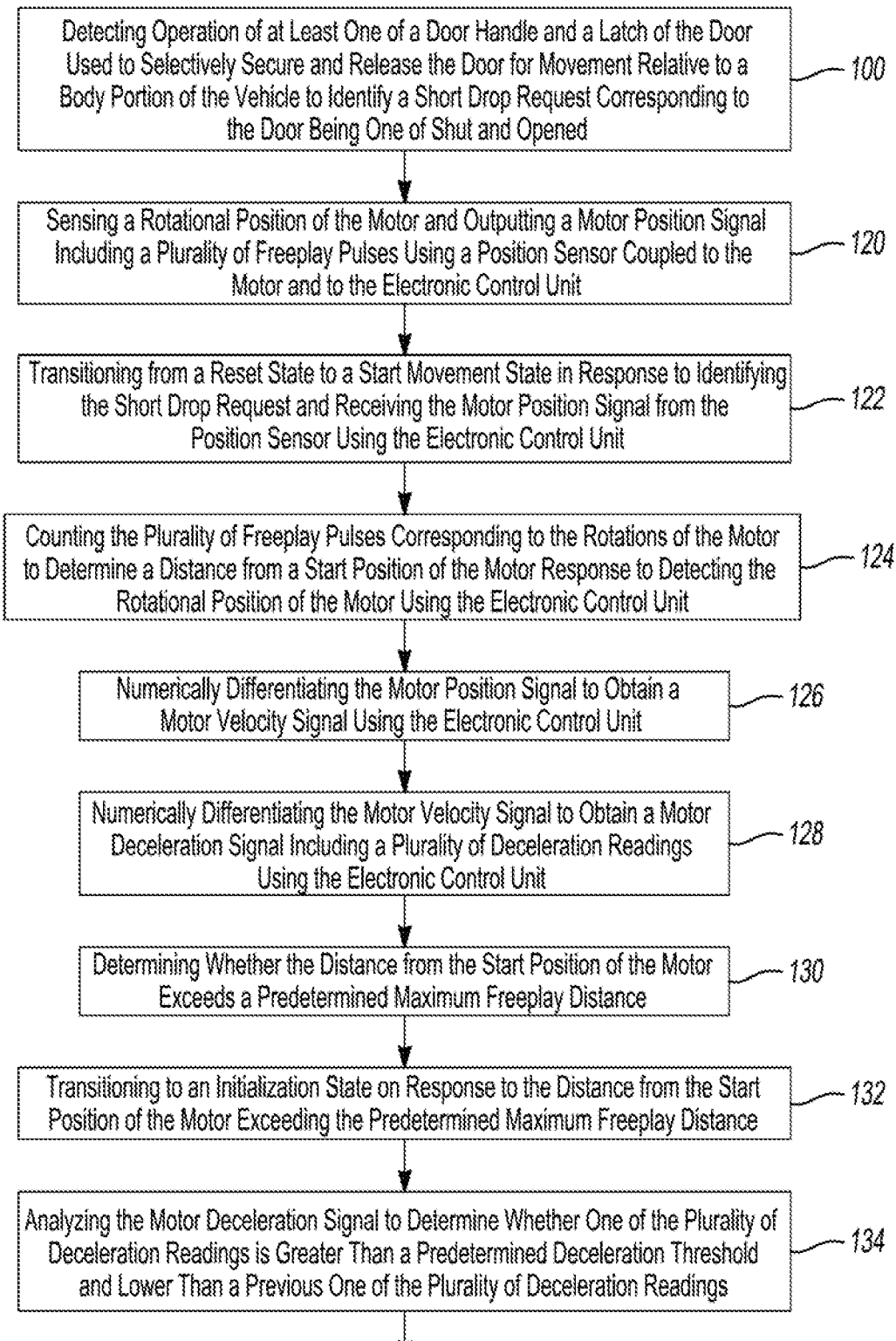
Figure 12B:
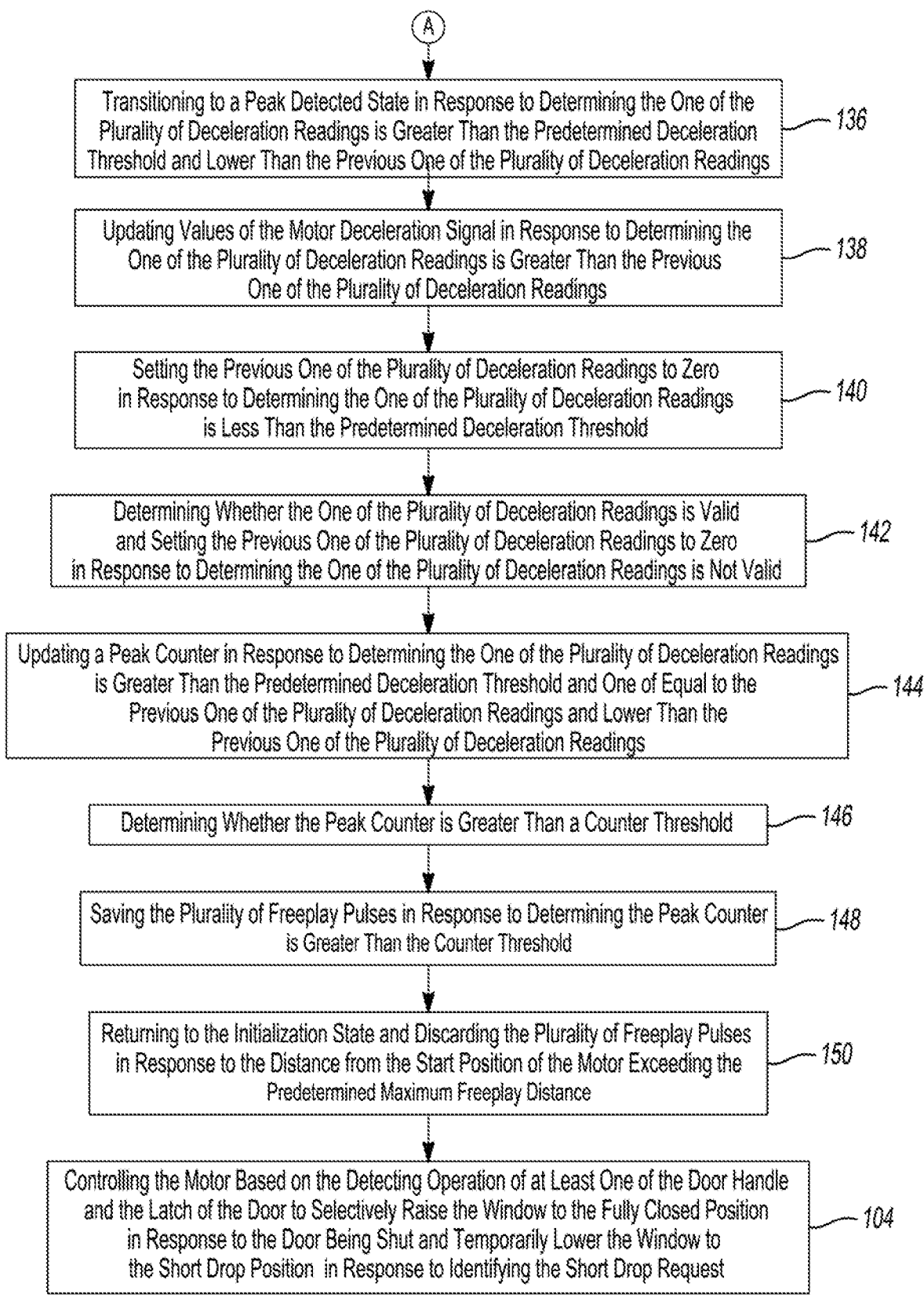

As implemented by second embodiment of the system 45' and referring to FIGS. 12A-12B, the step of 102 ensuring that no freeplay associated with one of slack in the at least one cable 34 and backlash of the at least one window regulator lifter plate assembly 40, 42 and the at least one rail 36, 38 exists in the window regulator system 45, 45' to provide accurate movement of the window 31 includes the step of 120 sensing a rotational position of the motor 32 and outputting a motor position signal including a plurality of freeplay pulses using a position sensor 52 coupled to the motor 32 and to the electronic control unit 46'. The method then proceeds by 122 transitioning from a reset state to a start movement state in response to identifying the short drop request and receiving the motor position signal from the position sensor 52 using the electronic control unit 46' and 124 counting the plurality of freeplay pulses corresponding to the rotations of the motor 32 to determine a distance from a start position of the motor 32 in response to detecting the rotational position of the motor 32 using the electronic control unit 46'. The method can continue by 126 numerically differentiating the motor 32 position signal to obtain a motor velocity signal using the electronic control unit 46' and 128 numerically differentiating the motor velocity signal to obtain a motor deceleration signal including a plurality of deceleration readings using the electronic control unit 46'.

The method carried out by second embodiment of the system 45' also includes the step of 130 determining whether the distance from the start position of the motor 32 exceeds a predetermined maximum freeplay distance. The method then includes the step of 132 transitioning to an initialization state in response to the distance from the start position of the motor 32 exceeding the predetermined maximum freeplay distance. The method proceeds with the step of 134 analyzing the motor deceleration signal to determine whether one of the plurality of deceleration readings is greater than a predetermined deceleration threshold and lower than a previous one of the plurality of deceleration readings. Next, 136 transitioning to a peak detected state in response to determining the one of the plurality of deceleration readings is greater than the predetermined deceleration threshold and lower than the previous one of the plurality of deceleration readings. The method also includes the step of 138 updating values of the motor deceleration signal in response to determining the one of the plurality of deceleration readings is greater than the previous one of the plurality of deceleration readings. The next step of the method is 140 setting the previous one of the plurality of deceleration readings to zero in response to determining the one of the plurality of deceleration readings is less than the predetermined deceleration threshold. The method also includes the steps of 142 determining whether the one of the plurality of deceleration readings is valid and setting the previous one of the plurality of deceleration readings to zero in response to determining the one of the plurality of deceleration readings is not valid. The method continues by 144 updating a peak counter in response to determining the one of the plurality of deceleration readings is greater than the predetermined deceleration threshold and one of equal to the previous one of the plurality of deceleration readings and lower than the previous one of the plurality of deceleration readings.

As best shown in FIG. 13, the deceleration signal of the motor 32 exhibits a peak at a position indicated as fifteen in the figure (i.e., the rotational position of the motor 32 is fifteen, that is 15 hall pulses, or freeplay hall pulses, have been detected representing 15 rotations of the motor 32 at which position the freeplay slack has been eliminated from the system and the window 31 begins to move down). This position can be added to a distance, as illustratively measured in Hall pulses (i.e., the predetermined short drop parameter distance measured in Hall pulses from the fully closed position to the ideal short drop final position) utilized when performing a short drop of the window 31 (e.g., indicated as forty in the figure, that is 40 hall pulses detected as a result of a motor rotation would ideally bring the window 31 to the correct short drop position if no slack or relaxation in the system existed) to determine a position when the motor 32 should be stopped (i.e., fifty five hall pulses from the motor start). The next steps of the method are 146 determining whether the peak counter is greater than a counter threshold, 148 saving the plurality of freeplay pulses in response to determining the peak counter is greater than the counter threshold, and 150 returning to the initialization state and discarding the plurality of freeplay pulses in response to the distance from the start position of the motor 32 exceeding the predetermined maximum freeplay distance.

As best shown in FIGS. 14 and 15, another method of operating a window 31 regulator system 45, 45' implementing an electronic tensioner for a window 31 coupled to a door 12, 13 of a vehicle 10 and movable between at least a fully open position and a fully closed position and a short drop position in which the window 31 moves a predetermined distance below the fully closed position is provided. The method begins with the step of 200 receiving a short drop position request and driving a motor 32 coupled to the window 31. The method proceeds by 202 detecting a maximum acceleration (e.g., deceleration) of the motor 32. A maximum acceleration may be determined for example by the electronic control unit 46' detecting a change in the rate of change of the acceleration slope of the analyzed freeplay pulses to determine when no slack and/or backlash exists in the system at an earlier time point when no peak validation, for example false peak detection may be required. The next step of the method is 204 initiating counting of a plurality of non-freeplay pulses of a motor position signal from a position sensor 52, for example in response to detecting the maximum acceleration. The method also includes the step of 206 stopping the motor 32 in response to the counting of the plurality of non-freeplay pulses of the motor position signal reaching a predetermined short drop position count.

In more detail, the step of 200 receiving a short drop position request and driving the motor 32 coupled to the window 31 can include the step of 208 operating the motor 32 coupled to the window 31 through a mechanical chain for moving at least one drive train component (e.g., the at least one cable 34, the at least one window regulator lifter plate assembly 40, 42, and the at least one rail 36, 38) at a first power level configured to remove slack in the mechanical chain without moving the window 31. In more detail, the method continues with the step of 210 operating the motor 32 at the first power level without moving the window 31 after the window 31 has been moved to a fully open position or 212 operating the motor 32 at the first power level without moving the window 31 after the window 31 has been moved to a fully closed position. Next, the method includes the step of 214 operating the motor 32 at a second power level greater than the first power level configured to move the window 31.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Those skilled in the art will recognize that concepts disclosed in association with the example window regulator system 45, 45' can likewise be implemented into many other systems to control one or more operations and/or functions.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

What is claimed is:

1. A window regulator system including an electronic tensioner for a window coupled to a door of a vehicle and movable between at least a fully open position and a fully closed position and a short drop position in which the window moves a predetermined distance below the fully closed position, comprising:
    a motor for moving at least one cable coupled to the window to move the window;
    a position sensor coupled to said motor for sensing a rotational position of said motor and outputting a motor position signal including a plurality of freeplay pulses corresponding with the rotational position of said motor;
    an electronic control unit electrically coupled to said motor and said position sensor and configured to:
        identify a short drop request to move the window between the fully closed position and the short drop position;
        ensure that no freeplay associated with one of slack in the at least one cable and backlash of at least one window regulator lifter plate assembly and at least one rail exists in said window regulator system based on the plurality of freeplay pulses to provide accurate movement of the window, and
        control said motor based to selectively raise the window to the fully closed position in response to the door being shut and temporarily lower the window to the short drop position in response to identifying the short drop request.

2. The window regulator system as set forth in claim 1, wherein said electronic control unit is configured to detect the rotational position of said motor using said position sensor and control said motor using the motor position signal.

3. The window regulator system as set forth in claim 1, wherein said electronic control unit is further configured to count the plurality of freeplay pulses corresponding to the rotations of said motor to determine a distance from a start position of said motor in response to detecting the rotational position of said motor.

4. The window regulator system as set forth in claim 3, wherein said electronic control unit is further configured to:

transition from a reset state to a start movement state in response to identifying the short drop request and receiving the motor position signal from said position sensor, determine whether the distance from the start position of said motor exceeds a predetermined maximum freeplay distance, transition to an initialization state in response to the distance from the start position of said motor exceeding the predetermined maximum freeplay distance, analyze a motor deceleration signal to determine whether one of a plurality of deceleration readings is greater than a predetermined deceleration threshold and lower than a previous one of the plurality of deceleration readings, transition to a peak detected state in response to determining the one of the plurality of deceleration readings is greater than the predetermined deceleration threshold and lower than the previous one of the plurality of deceleration readings, update values of the motor deceleration signal in response to determining the one of the plurality of deceleration readings is greater than the previous one of the plurality of deceleration readings, set the previous one of the plurality of deceleration readings to zero in response to determining the one of the plurality of deceleration readings is less than the predetermined deceleration threshold, determine whether the one of the plurality of deceleration readings is valid, set the previous one of the plurality of deceleration readings to zero in response to determining the one of the plurality of deceleration readings is not valid, update a peak counter in response to determining the one of the plurality of deceleration readings is greater than the predetermined deceleration threshold and one of equal to the previous one of the plurality of deceleration readings and lower than the previous one of the plurality of deceleration readings, determine whether the peak counter is greater than a counter threshold, save the plurality of freeplay pulses in response to determining the peak counter is greater than the counter threshold, and return to the initialization state and discard the plurality of freeplay pulses in response to the distance from the start position of said motor exceeding the predetermined maximum freeplay distance.

5. The window regulator system as set forth in claim 1, wherein said position sensor is a Hall effect sensor.

6. The window regulator system as set forth in claim 1, wherein said electronic control unit is further configured to:
    numerically differentiate the motor position signal to obtain a motor velocity signal,
    numerically differentiate the motor velocity signal to obtain a motor deceleration signal including a plurality of deceleration readings, and
    ensure that no freeplay associated with one of slack in the at least one cable and backlash of at least one window regulator lifter plate assembly and at least one rail exists in said window regulator system based on the motor deceleration signal to provide accurate movement of the window.

7. The window regulator system as set forth in claim 1, wherein said electronic control unit is further configured to remove the slack in the at least one cable and backlash of the at least one window regulator lifter plate assembly and the at least one rail by at least one of:

driving said motor with power sufficient to generate torque capable of moving said motor when said motor is free to run while not capable of moving the window; and driving said motor with power sufficient to generate torque capable of moving said motor to move the window in a direction towards the fully open position when said motor is free to run while not capable of moving the window in response to the window being in the fully closed position.

8. A window regulator system including an electronic tensioner for a window coupled to a door of a vehicle and movable between at least a fully open position and a fully closed position and a short drop position in which the window moves a predetermined distance below the fully closed position, comprising:

a motor for moving at least one cable coupled to the window to move the window;

an electronic control unit electrically coupled to said motor and configured to:

identifying a short drop request to move the window between the fully closed position and the short drop position;

ensure that no freeplay associated with one of slack in the at least one cable and backlash of at least one window regulator lifter plate assembly and at least one rail exists in said window regulator system to provide accurate movement of the window, and control said motor at one of a first power level to remove the slack without moving the window and at a second power level greater than the first power level to move the window based on identifying the short drop request to selectively raise the window to the fully closed position in response to the door being shut and temporarily lower the window to the short drop position in response to the door being opened.

9. The window regulator system as set forth in claim 8, wherein said electronic control unit is further configured to pulse width modulate a voltage supplied to said motor with a first duty cycle enabling said motor to move the window.

10. The window regulator system as set forth in claim 9, wherein said electronic control unit is further configured to:

pulse width modulate the voltage supplied to said motor with a second duty cycle being less than the first duty cycle and not enabling said motor to move the window, and stop the pulse width modulating the voltage supplied to said motor with the second duty cycle being less than the first duty cycle after a predetermined timeout has elapsed.

11. The window regulator system as set forth in claim 10, wherein said electronic control unit is further configured to update a zero position of said motor using the electronic control unit in response to stopping the pulse width modulating the voltage supplied to said motor with the second duty cycle being less than the first duty cycle after the predetermined timeout has elapsed.

12. The window regulator system as set forth in claim 8, wherein a rotational position of said motor is sensed using a Hall effect sensor.

13. A method of operating a window regulator system including an electronic tensioner for a window coupled to a door of a vehicle and movable between at least a fully open position and a fully closed position and a short drop position in which the window moves a predetermined distance below the fully closed position, comprising the steps of:

identify a short drop request to move the window between the fully closed position and the short drop position, sensing a rotational position of a motor coupled to the window and outputting a motor position signal including a plurality of freeplay pulses using a position sensor coupled to the motor and to an electronic control unit;

ensuring that no freeplay associated with one of slack in at least one cable and backlash of at least one window regulator lifter plate assembly and at least one rail exists in the window regulator system based on the plurality of freeplay pulses to provide accurate movement of the window; and controlling the motor to selectively raise the window to the fully closed position in response to the door being shut and temporarily lower the window to the short drop position in response to identifying the short drop request.

14. The method as set forth in claim 13, further including counting a plurality of position pulses corresponding to the rotations of said motor when said no freeplay exists and stopping the motor when the plurality of position pulses reaches a predetermined pulse count to move the window to the short drop position.

15. The method as set forth in claim 13, further comprising the steps of:

numerically differentiating the motor position signal to obtain a motor velocity signal using the electronic control unit;

numerically differentiating the motor velocity signal to obtain a motor deceleration signal including a plurality of deceleration readings using the electronic control unit;

wherein the step of ensuring that no freeplay associated with one of slack in the at least one cable and backlash of the at least one window regulator lifter plate assembly and the at least one rail exists in the window regulator system is based on the motor deceleration signal to provide accurate movement of the window.

16. The method as set forth in claim 13, including the step of counting the plurality of freeplay pulses corresponding to the rotations of the motor to determine a distance from a start position of the motor in response to detecting the rotational position of the motor using the electronic control unit.

17. The method as set forth in claim 14, further including the steps of:

transitioning from a reset state to a start movement state in response to identifying the short drop request and receiving the motor position signal from the position sensor using the electronic control unit;

determining whether the distance from a start position of the motor exceeds a predetermined maximum freeplay distance;

transitioning to an initialization state in response to the distance from the start position of the motor exceeding the predetermined maximum freeplay distance;

analyzing a motor deceleration signal to determine whether one of a plurality of deceleration readings is greater than a predetermined deceleration threshold and lower than a previous one of the plurality of deceleration readings;

transitioning to a peak detected state in response to determining the one of the plurality of deceleration readings is greater than the predetermined deceleration threshold and lower than the previous one of the plurality of deceleration readings;

updating values of the motor deceleration signal in response to determining the one of the plurality of deceleration readings is greater than the previous one of the plurality of deceleration readings;

setting the previous one of the plurality of deceleration readings to zero in response to determining the one of the plurality of deceleration readings is less than the predetermined deceleration threshold;

determining whether the one of the plurality of deceleration readings is valid;

setting the previous one of the plurality of deceleration readings to zero in response to determining the one of the plurality of deceleration readings is not valid;

updating a peak counter in response to determining the one of the plurality of deceleration readings is greater than the predetermined deceleration threshold and one of equal to the previous one of the plurality of deceleration readings and lower than the previous one of the plurality of deceleration readings;

determining whether the peak counter is greater than a counter threshold;

saving the plurality of freeplay pulses in response to determining the peak counter is greater than the counter threshold; and returning to the initialization state and discarding the plurality of freeplay pulses in response to the distance from the start position of the motor exceeding the predetermined maximum freeplay distance.

18. The method as set forth in claim 13, wherein the step of ensuring that no freeplay associated with one of slack in the at least one cable and backlash of the at least one window regulator lifter plate assembly and the at least one rail exists in the window regulator system to provide accurate movement of the window includes the step of removing slack in the at least one cable and backlash of the at least one window regulator lifter plate assembly and the at least one rail by driving the motor with power sufficient to generate torque capable of moving the motor when the motor is free to run while not capable of moving the window.

19. The method as set forth in claim 18, wherein the step of controlling the motor to selectively raise the window to the fully closed position in response to the door being shut and temporarily lower the window to the short drop position in response to identifying the short drop request includes the step of pulse width modulating a voltage supplied to the motor using the electronic control unit with a first duty cycle enabling the motor to move the window.

20. The method as set forth in claim 19, wherein the step of removing slack in the at least one cable and backlash of the at least one window regulator lifter plate assembly and the at least one rail by driving the motor with power sufficient to generate torque capable of moving the motor when the motor is free to run while not capable of moving the window includes the steps of:

pulse width modulating the voltage supplied to the motor using the electronic control unit with a second duty cycle being less than the first duty cycle and not enabling the motor to move the window; and stopping the pulse width modulating the voltage supplied to the motor using the electronic control unit with the second duty cycle being less than the first duty cycle after a predetermined timeout has elapsed.

* * * * *